3,423,170
MANUFACTURE OF ALKALI
METAL PHOSPHATES
Robert Harry Edwards, Whitehaven, England, assignor to Electric Reduction Company of Canada, Ltd., Toronto, Canada, a corporation of Canada
Filed May 3, 1965, Ser. No. 452,470
Claims priority, application Great Britain, May 4, 1964, 18,345/64
U.S. Cl. 23—107         7 Claims
Int. Cl. C01b 25/30

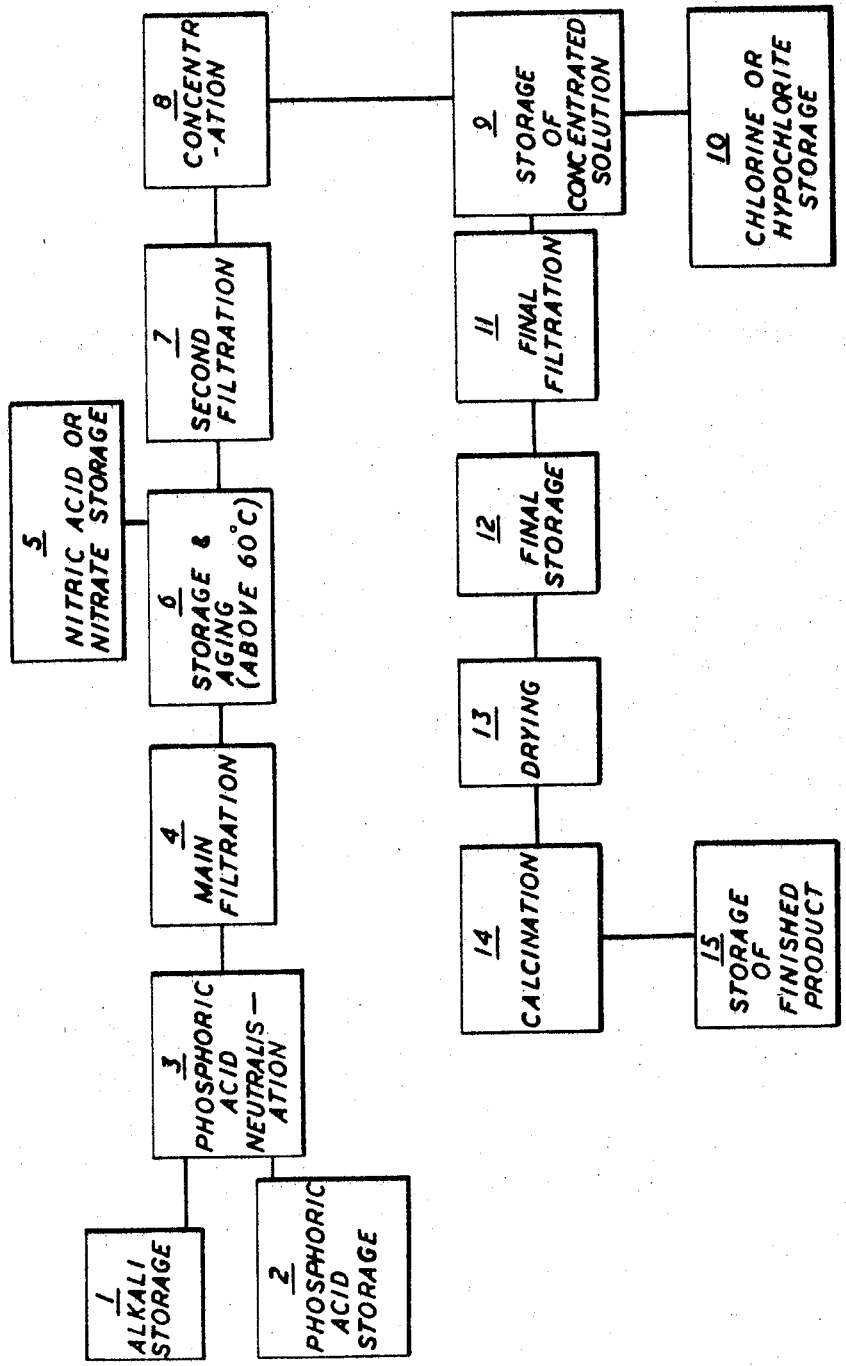

ABSTRACT OF THE DISCLOSURE

An improvement in the process for the manufacture of alkali metal phosphates in which wet process phosphoric acid is at least partially neutralized with an alkali metal compound and the neutralized acid filtered. The improvement comprises heating the filtrate at a temperature of at least 60° C. for at least two hours thereby precipitating residual calcium, magnesium, and iron salts. The precipitated salts are filtered off, and a second filtrate recovered from which water is evaporated to form a solid alkali metal phosphate product which is heated to dryness. The alkali metal phosphate is purified by addition of an oxidizing agent selected from chlorine and alkali metal hypochlorites to the filtrate.

---

Alkali metal phosphates are most frequently made from so-called thermal phosphoric acid, i.e., phosphoric acid made from phosphorus pentoxide. Although some alkali metal phosphate production utilises wet process acid, difficulty is experienced in obtaining a product sufficiently pure for use in water treatment or laundering. This is due to the presence of a number of impurities which are derived from the phosphate rock used for making wet process acid, and of which some cannot be entirely removed before or during neutralization.

One of the principal problems is to remove completely the colour of the finished phosphate. It has been proposed to bleach phosphoric acid by adding an oxidising agent but whatever the effect of this procedure on the colour of the acid, the latter does not usually, when neutralized, give rise to colourless phosphates. On the contrary, the procedure tends to cause a deterioration in the colour, at least when the final product is an alkali metal tripolyphosphate. In a previously described process for improving the colour of alkali metal pyrophosphates, an oxidising agent is added to the orthophosphate to be converted into pyrophosphate, either during the preparation of the orthophosphate or when it has been made. The only oxidising agents referred to are nitric acid and ammonium nitrate. In another prior proposal, nitric acid or a nitrate is added to orthophosphate to be converted into a tripolyphosphate in order to catalyse this conversion.

The neutralization of wet process phosphoric acid with alkali is followed by filtration (hereinafter called the "main filtration") to remove precipitates of insoluble phosphates, e.g., calcium, magnesium, aluminum and iron phosphates. Thereafter it is subjected to certain heating and evaporation steps and further filtrations and is then dried. We have found that the residual colour of the dried product is considerably reduced if the solution of alkali metal phosphate is oxidized with chlorine or an alkali metal hypochlorite at any stage after the main filtration, and my invention in one aspect consists in this step in the manufacture of alkali metal phosphates.

The improvement in the colour of the product is specific to the use as the oxidising agent of chlorine or a hypochlorite and the best results are, indeed, obtained if the addition of one of these agents after the main filtration is combined with the addition of nitric acid or an alkali metal nitrate before or after the main filtration. Neither the specific action of the chlorine or hypochlorite, nor the necessity of adding it after the main filtration could have been inferred from the literature referred to above, more especially as this literature mentions neither the oxidising agents in question nor the aforesaid main filtration.

The amount of chlorine or hypochlorite used depends on the amount of organic matter in the solution and enough chlorine or hypochlorite should be added to give a redox potential of the oxidised liquor of at least 500 millivolts and preferably 800 millivolts measured using a platinum electrode and a calomel reference electrode. A typical requirement is 0.9 lb. of oxidising agent calculated as NaOCl per 100 lbs. $P_2O_5$, that is to say about 1% by weight based on the $P_2O_5$.

A further feature of the invention consists in heating the filtrate from the main filter at a temperature above 60° C. for at least two hours to precipitate residual calcium, magnesium and iron, which are then filtered off. The higher the temperature the shorter the time for which the liquor should be heated, and vice versa. Thus, for example, heating for two hours is desirable at 90° C. and for ten hours at 60° C.

After this second filtration, the liquor is concentrated by evaporation in a known manner, for example, to a concentration of 27% $P_2O_5$ to 32.5% $P_2O_5$, preferably 30–32% $P_2O_5$. According to a further feature of my invention the concentrated liquor is again filtered. I have found that this third filtration is rendered easier by the second filtration described above.

After the third filtration, the liquor is dried and calcined to produce tripolyphosphate in a known manner.

The invention is illustrated by way of example by the accompanying drawing which is a flow sheet of the manufacture of sodium tripolyphosphate from wet process phosphoric acid.

In the drawing, aqueous alkali and wet process phosphoric acid are taken from storage vessels 1 and 2 respectively to a neutralising vessel 3. The neutral liquor is passed to a filter 4 where the main filtration is carried out. Nitric acid or an alkali metal nitrate is passed from a storage vessel 5 into a vessel 6 in which the filtrate from filter 4 is aged at a temperature above 60° C. for a time of at least two hours, depending on the temperature. The amount of nitrate added depends on the phosphate rock used for making the acid and may vary from 0.05 to 1.5 parts calculated as $NaNO_3$ per 100 parts of $P_2O_5$. After ageing, the liquor is filtered in filter 7 and is passed to an evaporator 8 where it is concentrated to a $P_2O_5$ content of 30–32% by weight. The concentrated solution is stored in vessel 9 and chlorine or an alkali metal hypochlorite is added in the quantity referred to above from a storage vessel 10. From vessel 9, the liquor is passed to the final filter 11 and the filtrate is stored in vessel 12. The solution then passes to an evaporator 13 in which a dry solid is produced. This solid is calcined in calciner 14 to form tripolyphosphate which is stored in container 15.

If desired, the nitric acid or nitrate may be added at any stage from 1–13 instead of at vessel 6, and the chlorine or hypochlorite may be added at vessel 6 or vessel 12 instead of at vessel 9.

What I claim is:
1. The improvement in the process for the manufacture of alkali metal phosphates wherein phosphoric acid is at least partially neutralized with an alkali metal compound to obtain a neutralized phosphoric acid and to precipitate insoluble phosphates, and filtering to remove the precipitate and obtain a filtrate, adding an oxidizing agent selected from the group consisting of chlorine and alkali metal hypochlorites to said filtrate, evaporating water from said filtrate to form a solid alkali metal phos- phate product and heating said solid product to dryness, the improvement comprising using wet process phosphoric acid as the phosphoric acid reactant, and heating the filtrate obtained from the filtration of said neutralized phosphoric acid to a temperature of at least 60° C. for at least two hours thereby precipitating residual calcium, magnesium and iron salts in said filtrate, and removing said precipitated residual salts by filtration.

2. The process of claim 1 wherein the filtrate obtained after removing the precipitated residual calcium magnesium and iron salts resultant from heating to at least 60° C., is concentrated by evaporation, to form a more concentrated filtrate which is again filtered to remove any solid material contained therein.

3. The process of claim 2 wherein at least one compound selected from the group consisting of nitric acid and nitrates, is added to the filtrate obtained from the neutralization of said wet process phosphoric acid.

4. The process of claim 3 wherein the amount of oxidizing agent added is such as to give a redox potential of at least 500 millivolts, and preferably 800 millivolts, measured when using a platinum electrode and a calomel reference electrode.

5. The process of claim 4 wherein the amount of said oxidizing agent added is about 1% by weight calculated as NaOCl based on the amount of $P_2O_5$ in the liquid filtrate treated.

6. The process of claim 5 wherein the dried solid product is calcined to produce tripolyphosphate.

7. The process of claim 6 wherein said tripolyphosphate is sodium tripolyphosphate.

References Cited

UNITED STATES PATENTS

| 1,984,146 | 12/1934 | Lindberg | 23—107 |
| 1,998,182 | 4/1935 | Anable | 23—107 |
| 3,305,304 | 2/1967 | Peterson | 23—107 |
| 1,642,244 | 9/1927 | Howard | 23—107 |
| 1,834,455 | 12/1931 | Johnson | 23—107 |
| 1,961,127 | 6/1934 | Coleman | 23—107 |
| 2,536,456 | 1/1951 | Miller | 23—86 |
| 2,977,191 | 3/1961 | Pottiez | 23—107 |

EARL C. THOMAS, *Primary Examiner.*

L. A. MARSH, *Assistant Examiner.*